(12) United States Patent
Dagan

(10) Patent No.: US 10,177,984 B2
(45) Date of Patent: *Jan. 8, 2019

(54) ISOLATION OF PROBLEMS IN A VIRTUAL ENVIRONMENT

(71) Applicant: EntIT Software LLC, Sunnyvale, CA (US)

(72) Inventor: Assaf Dagan, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 430 days.

This patent is subject to a terminal disclaimer.

(21) Appl. No.: 14/815,701

(22) Filed: Jul. 31, 2015

(65) Prior Publication Data

US 2017/0034001 A1 Feb. 2, 2017
US 2018/0026848 A9 Jan. 25, 2018

Related U.S. Application Data

(63) Continuation of application No. 13/812,613, filed as application No. PCT/US2010/046856 on Aug. 26, 2010, now Pat. No. 9,122,784.

(51) Int. Cl.
*G06F 11/00* (2006.01)
*H04L 12/24* (2006.01)
(Continued)

(52) U.S. Cl.
CPC .......... *H04L 41/12* (2013.01); *G06F 9/45558* (2013.01); *G06F 11/1464* (2013.01);
(Continued)

(58) Field of Classification Search
CPC ..... H04L 41/12; H04L 43/16; H04L 43/0823; G06F 11/1464; G06F 17/30598;
(Continued)

(56) References Cited

U.S. PATENT DOCUMENTS 5,704,036 A 12/1997 Brownmiller et al.
5,784,359 A 7/1998 Bencheck et al.
(Continued)

FOREIGN PATENT DOCUMENTS

CN 101350044 1/2009

OTHER PUBLICATIONS

International Search Report dated May 26, 2011 for PCT/US2010/046856, Applicant Hewlett-Packard Development Company, L.P. et al., Korean Intellectual Property Office, 3 pages.
(Continued)

*Primary Examiner* — Yair Leibovich

(57) ABSTRACT

Problem isolation in a virtual environment is described. In one example, a method (300) is provided for isolating problems in a virtual environment. The method includes maintaining (310) a topology of network devices in the virtual environment. The virtual environment can be monitored (320) using a performance module for network device operation irregularities exceeding a threshold. A network device operation irregularity can be identified (330) as well as a portion of the topology associated with the network device operation irregularity. Topology portions associated with network device operation irregularities can be grouped (340) together using a snapshot module to form a snapshot of a problem topology.

17 Claims, 4 Drawing Sheets

(51) Int. Cl.
*H04L 12/26* (2006.01)
*G06F 11/14* (2006.01)
*G06F 9/455* (2018.01)
*G06F 17/30* (2006.01)

(52) U.S. Cl.
CPC .......... *H04L 43/0823* (2013.01); *H04L 43/16* (2013.01); *G06F 17/30283* (2013.01); *G06F 17/30598* (2013.01); *G06F 2009/45591* (2013.01); *G06F 2009/45595* (2013.01); *G06F 2201/84* (2013.01)

(58) Field of Classification Search
CPC ....... G06F 9/45558; G06F 2009/45591; G06F 2009/45595; G06F 2201/84; G06F 17/30283
USPC ............................................ 714/26; 709/224
See application file for complete search history.

(56) References Cited

U.S. PATENT DOCUMENTS

| | | | |
|---|---|---|---|
| 6,336,065 B1* | 1/2002 | Gibson | B61C 17/04 |
| | | | 340/438 |
| 7,240,325 B2 | 7/2007 | Keller | |
| 7,796,500 B1 | 9/2010 | Elliott et al. | |
| 8,667,334 B2* | 3/2014 | Dagan | G06F 11/0712 |
| | | | 714/37 |
| 8,676,553 B2 | 3/2014 | Miwa et al. | |
| 9,122,784 B2* | 9/2015 | Dagan | H04L 41/065 |
| 10,027,544 B1* | 7/2018 | McEvoy | H04L 41/0816 |
| 2005/0076113 A1* | 4/2005 | Klotz | H04L 41/12 |
| | | | 709/224 |
| 2006/0002409 A1* | 1/2006 | Menon | H04L 12/4641 |
| | | | 370/409 |
| 2007/0250608 A1 | 10/2007 | Watt | |
| 2008/0126858 A1* | 5/2008 | Barras | G06F 11/327 |
| | | | 714/25 |
| 2009/0303884 A1 | 12/2009 | Kimura et al. | |
| 2010/0077078 A1* | 3/2010 | Suit | G06F 21/566 |
| | | | 709/224 |
| 2010/0082922 A1 | 4/2010 | George et al. | |
| 2010/0107158 A1 | 4/2010 | Chen et al. | |
| 2010/0118709 A1* | 5/2010 | Bajpay | H04L 41/5009 |
| | | | 370/242 |
| 2014/0046645 A1* | 2/2014 | White | G06F 17/509 |
| | | | 703/13 |

OTHER PUBLICATIONS

European Patent Office, Extended European Search Report for Appl. No. 10856518.5 dated May 6, 2015 (7 pages).

* cited by examiner

ISOLATION OF PROBLEMS IN A VIRTUAL ENVIRONMENT

The present application is a Continuation of U.S. application Ser. No. 13/812,613, filed on Jan. 28, 2013, which is a 371 U.S. Nationalization of International Patent Application No. PCT/US2010/046856, filed Aug. 26, 2010, each of which are incorporated herein by reference in their entirety.

BACKGROUND

The identification and tracking of dependencies between the components of distributed systems can be important for integrated fault management. Failures occurring in one service or part of a system can often affect other services, systems, devices, etc. Dependencies often exist between the components of different services on a single system and also between client and server components of a service across multiple systems and domains.

A service or system component can often have dependencies and also be dependent on another service or system component. Dependencies can exist between various components of a distributed system, such as end-user services, system services, applications and associated logical and physical components. However, service dependencies are often not explicit in today's systems, thus complicating tasks of problem determination, isolation and resolution.

Current solutions have a number of drawbacks. For example, dependencies may not be clearly identified in problem determination, isolation and resolution solutions. Also, current solutions can provide much more problem data to a system administrator than is useful, complicating the processes of problem determination, isolation and resolution. Furthermore, problem data that is provided to the system administrator may be presented in a manner which is difficult to interpret, time-consuming to sift through, and for which the system administrator often receives specialized training and experience to be able to understand and analyze.

Due to the heterogeneity of components of a distributed system with which the problem isolation process is involved, determining the impact of a system failure can be difficult given the limitations of existing techniques. Some additional shortcomings of existing techniques include: existing techniques address installation and deployment phases of a software product but do not attempt to capture runtime aspects; existing techniques do not deal with end-to-end applications or services that span multiple systems; software inventory information is often described in a proprietary format making sharing this information difficult among various heterogeneous systems; and existing techniques do not effectively discover and represent the topology of distributed applications and services. These drawbacks, and others, can result in wasted time, effort, and money.

DETAILED DESCRIPTION

Figure 1:
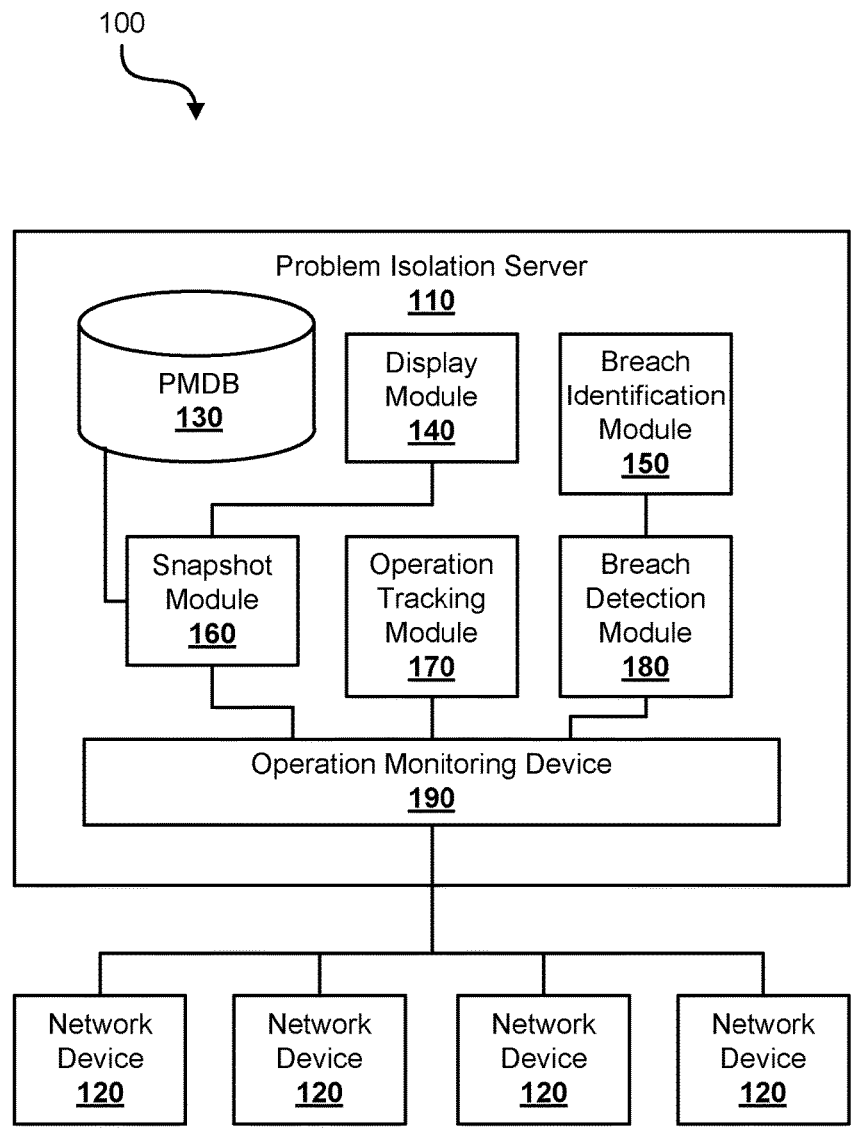
FIG. 1 is a block diagram of a system for isolating problems in a virtual environment in accordance with an example.

Reference will now be made to the examples illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

There is a shift occurring in the way businesses view, comprehend, and map information technology (IT) resources to business goals. Many IT executives are beginning to re-orient the way IT resources are monitored and optimized based more directly on business needs. Businesses are focusing on how business processes provided by IT, such as order processing, are meeting business objectives rather than focusing solely on the availability and performance of the servers, routers, and applications that make up the IT infrastructure.

Systems and methods have been developed to allow organizations to monitor infrastructure and services from an IT perspective. For example, a business-focused metric might look at the dollar impact of server downtime as opposed to an IT-focused metric that identifies the percent uptime for the same server. Some such systems have used a Configuration Management Database (CMDB), where information about IT assets such as servers, routers, and desktops can be stored. The CMDB can include a history and inter-relationships between system components. The CMDB in combination with business-focused metrics has enabled bi-directional communication between IT and business managers. These systems can provide solutions to various IT issues, including problem management.

A problem management process can have both reactive and proactive aspects. The reactive aspect is concerned with solving problems in response to one or more incidents. Proactive problem management is concerned with identifying and solving problems and known errors before incidents before such problems or incidents occur. Problems and known errors can be identified by analyzing incidents as they occur (reactive problem management), analyzing incidents over differing time periods (proactive problem management), analyzing an IT Infrastructure, and the provisioning of a knowledge database.

One part of a problem management process may include isolation of the problem in order to identify what the problem is. After a problem has been identified, an administrator can attempt to remedy the problem. The following disclosure describes problem isolation systems and methods. More particularly, problem isolation in a virtual environment is described herein. For example, a method is provided for isolating problems in a virtual environment. The method includes maintaining a topology of network devices in the virtual environment. The virtual environment can be monitored using a performance module for network device operation irregularities exceeding a threshold. A network device operation irregularity can be identified as well as a portion of the topology associated with the network device operation irregularity. Topology portions associated with network device operation irregularities can be grouped together using a snapshot module to form a snapshot of a problem topology. The problem isolation described herein is directed primarily at reactive problem management, but may also be included in proactive problem management solutions.

Referring to FIG. 1, a system 100 is shown for identifying problems in a virtual or virtualized environment. A virtual environment can include both virtual and physical aspects. For example, a plurality of virtual servers may reside on a physical server. A virtual network may be physically connected to a physical network. A virtual machine may comprise a software or hardware-assisted implementation of a machine (e.g., computer). Virtualization can enable creation of system infrastructure on demand, which in turn can enable a fast response to the ever-changing issues facing businesses. Virtualization can allow administrators to manage pooled resources across the enterprise. Virtualization gives developers a way to create test configurations, and then destroy them and start over, without the procurement time and expense of building a dedicated test system, and without disrupting primary operating systems. Server virtualization can bring a new level of availability to business applications that are more affordable and less complex to set up than the traditional methods. Virtualization techniques can extend to networks, storage, operating systems, applications, and laptop or server hardware, allowing better leverage of infrastructure investments.

Virtual systems tend to be more dynamic and flexible than purely physical systems and are frequently changed. As a result, problem isolation in a virtualized environment can be more challenging than in the purely physical systems. The system 100 of FIG. 1 can assist in isolating and identifying problems in a virtual environment, even after the environment has changed.

The system 100 can include a problem isolation server 110. The problem isolation server can be in communication with the virtualized environment. A performance management database (PMDB) 130 can reside on or be in communication with the problem isolation server and be configured to maintain a topology of configuration items (CIs) representing network devices 120 in the virtual environment.

The PMDB 130 can store a system topology (such as may be obtained from a CMDB), service level information, and business service measurements (or fact measures) within the context of a business service's specific hierarchy. The use of PMDB can assist in problem isolation, business service optimization, and reporting on the results of analysis and/or on measurement data. A business service or a business service model may refer to system components such as hosts, virtual machines, and so forth. The hosts and virtual machines can have unique identifiers.

Monitoring systems may produce demand traces which can have the same unique identifiers as the hosts and virtual machines. When monitoring data is loaded into the PMDB via an extract, transform, load (ETL) process, a matching process can be performed to correlate monitoring data from a monitoring system with particular hosts and/or virtual machines in the business service topology.

The PMDB can include a data mart for storing topology information, measurement data, etc. The data mart can record information about data stored in the data mart. For example, the data mart may store information such as the time the data was received, the server from which the data was received, a fact (such as topology or measurement data), a service associated with the fact, etc.

The CIs stored in the PMDB can correspond to managed objects. For example, a managed object may be as simple as a central processing unit (CPU) or as complex as a business service of an enterprise. In other words, CIs can include hardware, software, or documentation of system components on virtually any scale. There are a large number of pre-existing data models with CI types that are defined to model information about complex business service topologies. Common application solution platforms such as SAP (System Analysis & Program development), .NET, MS (Microsoft) Exchange and others have models of CIs with known hierarchies that are specific to such platforms.

The PMDB can be a reconciliation of information from the CMDB with operational usage information. A collector infrastructure of the PMDB can gather information from operational usage repositories and the CMDB. ETL content packs, which are software packages that facilitate the integration of data into data warehouses, can read operational usage information, create measurement tables within a data mart, and record measurements and time dimensions. Topology information from the CMDB can guide the content packs' definition of bridge tables (i.e., tables that maintain relationships, in the data mart that puts device measurements into context). In other words, the bridge tables can organize the measurements. Each CI in a topology can be inserted as a table row in the bridge tables and is a dimension for categorizing the measurement. Managed object identifier information that is common to both the operational data and the topology data can guide this reconciliation process so that each device is related to a relevant context. For example, within the PMDB, a CPU measurement table may be associated with multiple dimensions that reflect a relationship with a virtual machine (VM), an application server, an application server pool, a constraint, etc. In prior solutions, a CPU measurement may have only been associated with a virtual machine of a particular physical server. In the systems described herein, the multiple dimensions of the relationship can reflect the context of the CPU measurement within the whole business service topology. Metrics, such as CPU usage or power usage at several levels of abstraction (e.g., for a particular application server or for a business service), can be quickly summarized or aggregated. In a similar manner, topology facts can be associated with their constraints.

In one aspect, the monitoring system used with the PMDB comprises an operation monitoring device 190. The operation monitoring device can monitor the virtual environment for network device operation metrics. In a more specific example, the operation monitoring device can monitor the virtual environment for network device operation metrics breaching a baseline. The system 100 can include an operation tracking module 170 in communication with the operation monitoring device. Both the operation tracking module and the operation monitoring device can be in direct or indirect communication with the PMDB to access or store information related to the network devices 120. The operation tracking module can be configured to track network devices. In particular, the operation tracking module can track operation of the network devices over a period of time to establish what is normal or usual device operation. In another example, the operation tracking module can be configured to track normal network device operation, or device operation which is known to not be problematic. In either example, the normal device operation metrics can be used to establish a baseline or a standard by which subsequently monitored metrics are compared. In one aspect, the operation tracking module can directly access data obtained from the operation monitoring device. In another aspect, the operation tracking module can retrieve metrics stored in the PMDB to establish the baseline. The operation tracking module can be configured to periodically update the baseline, for example if normal operation metrics have changed, if a system infrastructure has changed, etc.

The system 100 can include a breach detection module 180. The breach detection module can be configured to detect when monitored network device operation metrics breach the baseline. In one example, the baseline comprises a baseline sleeve. The baseline sleeve can include a range of metrics, within which monitored network device operation metrics may be considered normal. The breach detection module can thus detect when monitored network device operation metrics breach the baseline sleeve, or fall outside of the "normal" range.

When the breach detection module 180 detects monitored network device operation metrics breaching a baseline or a baseline sleeve, a breach identification module 150 can identify CIs in the PMDB related to the network device operation metrics breaching the baseline.

A snapshot module 160 can group related CIs together using a processor and can form a snapshot of a problem topology based on the topology stored within the PMDB 130. In one example, the CIs grouped together can include those CIs identified by the breach identification module 150 as being related to the network device operation metrics breaching the baseline. Thus, the snapshot of the problem topology may comprise a partial topology of the system rather than the entire system topology. Also, the partial topology includes only those items relevant to the problem (i.e., the metric breaching the baseline) and is thus a focused and easily digestible topology for a system administrator to consider. In other words, the snapshot excludes CIs not related to the network device operation metrics breaching the baseline. The snapshot can be stored in the PMDB. The snapshot can represent a state of the problem topology existing at the time of network device operation irregularities or breach of the baseline.

Figure 2:
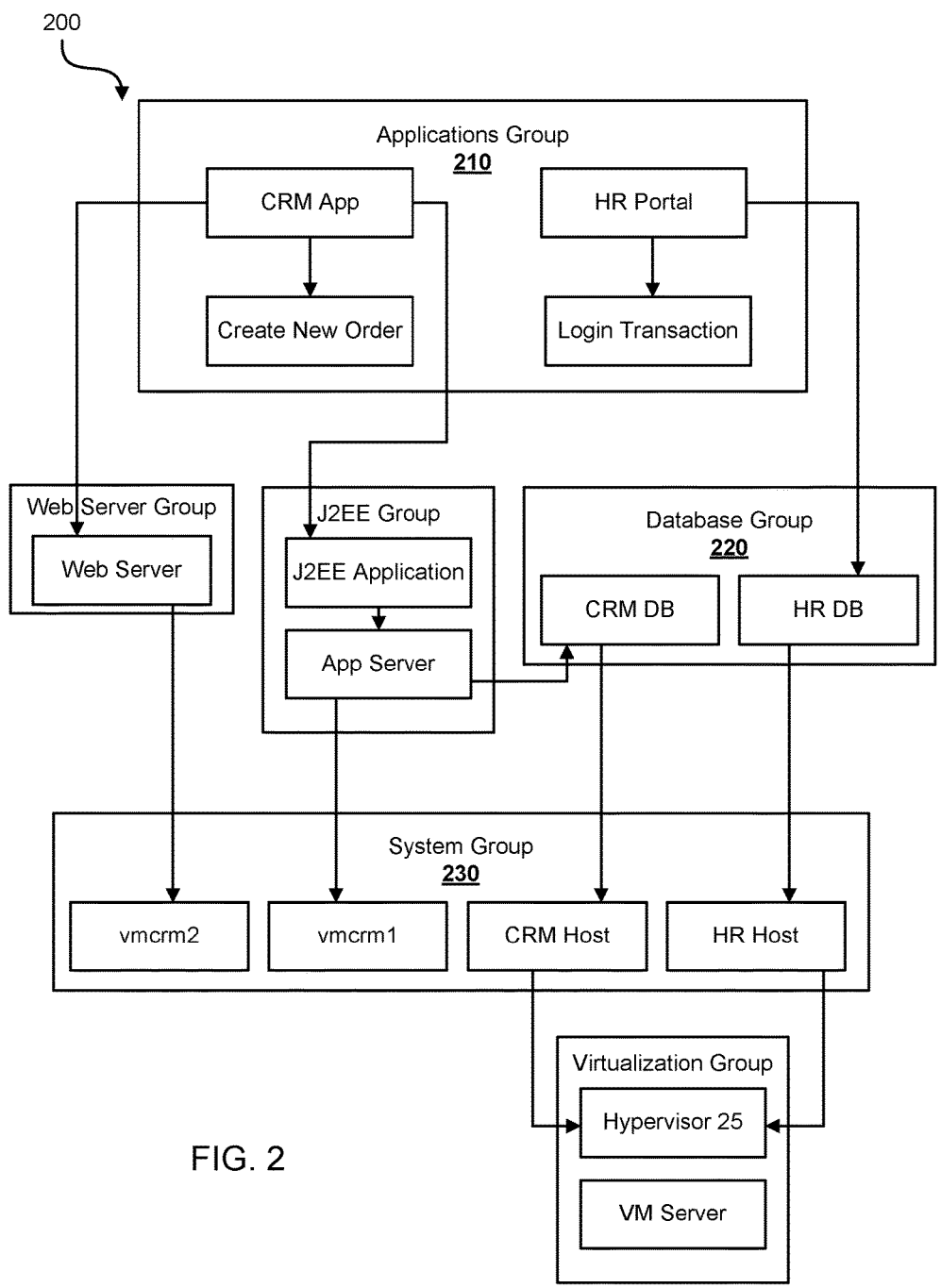
FIG. 2 is a snapshot of a problem topology in accordance with an example.

The system can also include a display module 140. The display module can be configured to graphically represent the snapshot, including relationships of the related CIs, for display on a user display device. An example snapshot is shown in FIG. 2. The snapshot can be transmitted over a bus to a user display device to display the snapshot of the topology existing at the time of the metric baseline breach, even after a change in the topology of the virtualized environment.

FIG. 2 represents an example snapshot 200 captured by the snapshot module described above regarding FIG. 1. The snapshot can be represented by a graph showing a relationship between the CIs or topology portions grouped together to form the snapshot. In the example shown in FIG. 2, the CIs within the snapshot group can further be grouped into more specific CI sub-groups. For example, the snapshot CIs can be organized by an applications group 210, a database group 220, a system group 230, and so forth. Each CI within the snapshot can be identified within the sub-groups. For example, the applications group can include a CRM application, a "create new order" application, a human relations (HR) portal, a login transaction, and so forth.

Thus, the relationships included in the snapshot may comprise the CI sub-groups. In another example, however, the relationships can include causal relationships. For example, if Hypervisor 25 metrics breached the baseline, an administrator may find a causal relationship useful in determining a root cause of Hypervisor 25 issue by following a call path back from Hypervisor 25 to CRM Host to CRM Database (DB) to the J2EE Application Server to the J2EE Application to the CRM Application.

In another example, the relationships included in the snapshot may comprise chronological relationships. For example, the snapshot may show which CIs breached the baseline in which order. The CIs illustrated in the graph of the snapshot can be organized according to a time of baseline breach or even a duration of the baseline breach.

For example, earlier occurring breaches can be near the top of the graph and later occurring breaches can be near the bottom of the graph. As another example, earlier occurring breaches can be near the left side of the graph and later occurring breaches can be near the right side of the graph. The graph can also include a timeline to illustrate a time of occurrence or a duration of the breach.

In another example, the relationships included in the snapshot may comprise topological relationships. For example, the graph of the snapshot may show which CIs are related or how the CIs are related, if at all, according to actual connections or communication paths between CIs.

In one example, CIs or portions of the topology associated with metric baseline breaches or irregularities can be grouped together when the network device operation irregularities occur within a predetermined time interval from one another.

Problem isolation systems can detect problems in near real-time. Once a problem is detected a problem isolation system utilizing the technology described herein can take a topological snapshot of the problem area. The administrator can later analyze the problem and find a root cause even if the environment has changed due to the flexible nature of the virtualized environment.

The processes or system components described above can result in well-defined graphs which represent the problem topology. The topology is well-scoped, and a size of the topology is limited to the problematic area. Therefore, problem isolation can store these partial topologies. These topologies can later on be used by an application owner or administrator who is trying to analyze the problem and a root cause of the problem. Since the problem isolation system has captured the problem topology at the time the problem occurred, the system can also show any related change that happened around that time. The ability to capture a snapshot of problem topologies can be very valuable where more and more IT organizations are rapidly moving into virtualized environments. Virtual environments are often flexible and virtual machines can move from one hypervisor to another in a single click. As a result, taking snapshots of problem topologies can be a valuable tool is analyzing problems and tracking changes that happen around that time.

While analyzing problems in a virtualized environment, the topology of the TT system at the time of the problem and any changes that occurred at or near that time can be useful in understanding the problem. The flexible architecture of virtual environments tends to create situations where the environment has changed, such as a machine moving from one hosting server to another for example, between the time the problem was detected and the time when the administrator can analyze the problem. Such scenarios can mislead or confuse a user and the user may spend time trying to analyze irrelevant configuration items.

In most other systems, snapshots are taken only on a periodic basis and can include an entire topology. These other systems are not able to take a topological snapshot of problems when the problems are detected or a snapshot of only the portion of the topology involved in the problem.

As described above, problem isolation systems can detect abnormalities or irregularities of metrics of CIs in near real-time analysis. Metrics can be defined as abnormal, irregular, or anomalous if continuously breaching a baseline or baseline sleeve. The systems can implement analysis cycles to periodically detect abnormal metrics. The analysis cycles can be set to run at predetermined time intervals, such as every five minutes for example. On each analysis cycle, the problem isolation system can detect existing continuously abnormal metrics, find the related configuration items for each metric, group all related configuration items based on an Operations Database (ODB) model within the PMDB, and connect each group of CIs on a graph which represents a single problem topology.

Figure 3:
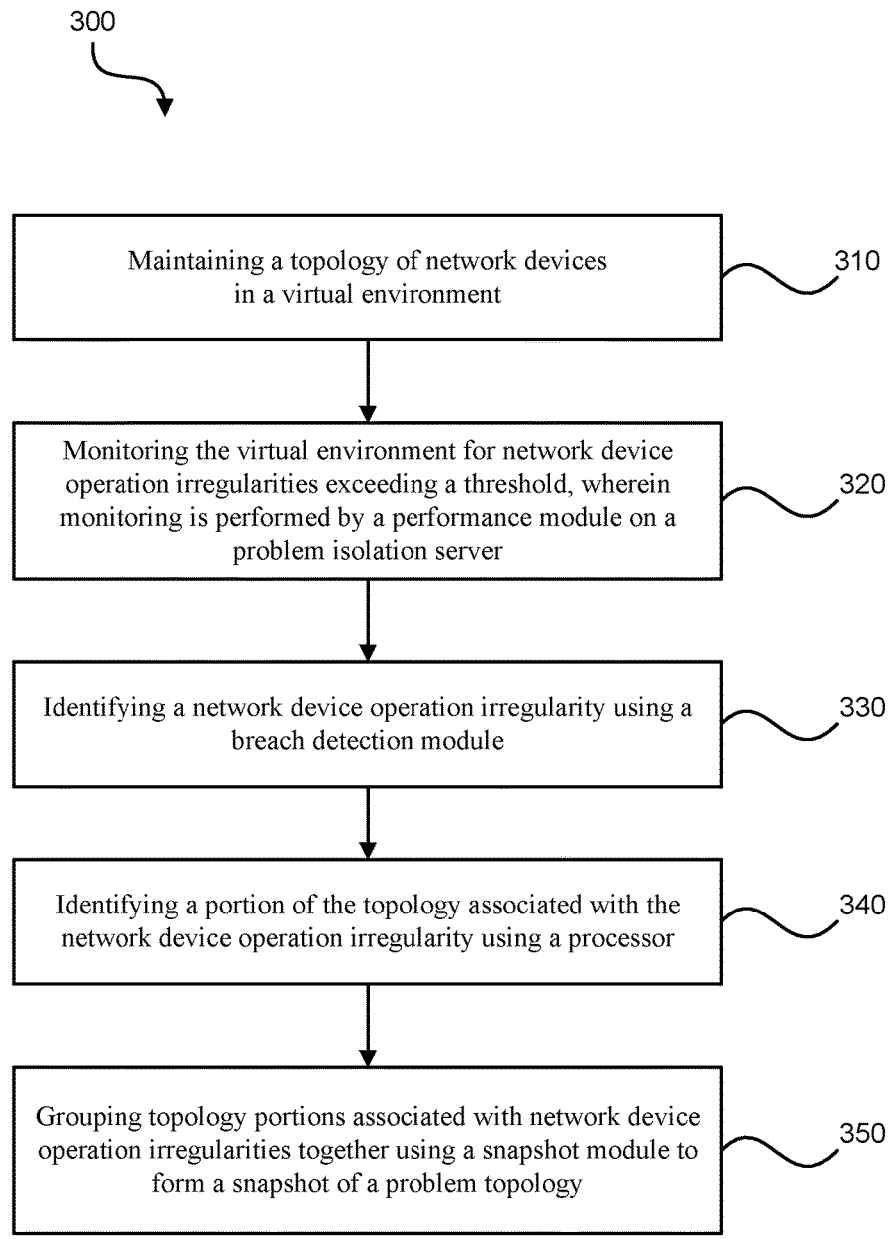
FIG. 3 is a flow diagram of a method for isolating problems in a virtual environment involving grouping topology portions together in accordance with an example.

Referring now to FIG. 3, a method 300 is shown for isolating problems in a virtual environment. The method can include maintaining 310 a topology of network devices in the virtual environment. The virtual environment can be monitored 320 for network device operation irregularities exceeding a threshold, wherein monitoring is performed by a performance module. A network device operation irregularity can be identified 330. A portion of the topology associated with the network device operation irregularity can be identified 340. Topology portions associated with network device operation irregularities can be grouped 350 together using a snapshot module to form a snapshot of a problem topology.

The basis for taking problem snapshots can be the automatic detection of metric abnormalities. Detection of metric abnormalities or irregularities according to the method can be done using base-lining and seasonality learning methods. Taking a full and accurate snapshot of a problem can be based on clustering abnormal metrics into one anomaly disclosure.

The method 300 can include creating a graph representing the snapshot, wherein the graph shows a relationship between the topology portions grouped together. As described above, the relationship between the topology portions grouped together can be causal, chronological, topological, or any other suitable grouping. In one example, topology portions associated with network device operation irregularities are grouped together when the network device operation irregularities occur within a predetermined time interval from one another. In another example, topology portions associated with network device operation irregularities are grouped together when the network device operation irregularities are causally linked together.

The method can also include storing the snapshot in a snapshot database on a problem isolation server. For example, the snapshot database may comprise the PMDB.

Figure 4:
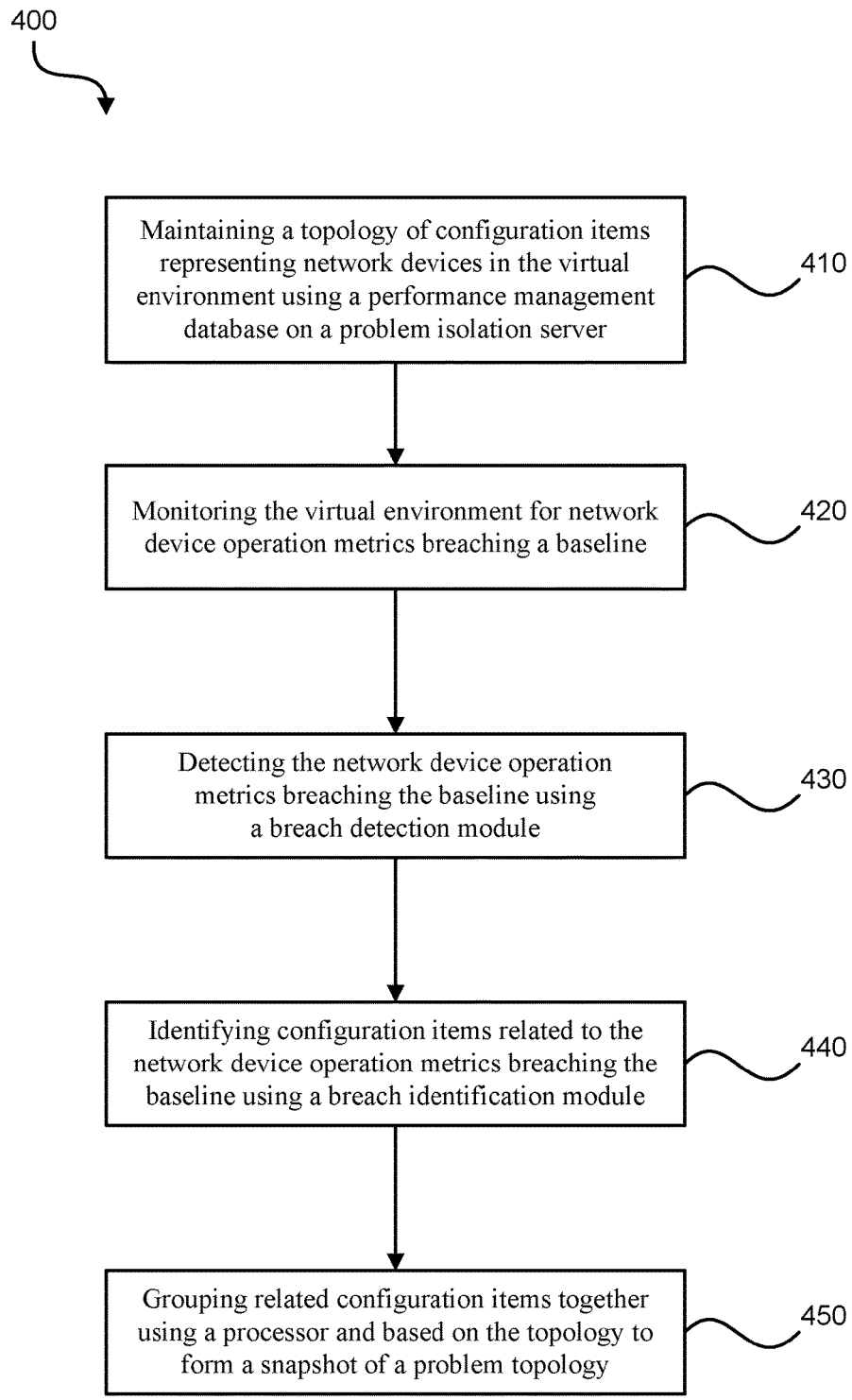
FIG. 4 is a flow diagram of a method for isolating problems in a virtual environment involving grouping configuration items together in accordance with an example.

Referring to FIG. 4, a method 400 is shown for problem isolation in a virtual environment. The method includes maintaining 410 a topology of configuration items representing network devices in the virtual environment using a performance management database on a problem isolation server. The virtual environment can be monitored 420 for network device operation metrics breaching a baseline, or alternately a baseline sleeve. The network device operation metrics breaching the baseline can be detected 430 using a breach detection module. Configuration items related to the network device operation metrics breaching the baseline can be identified 440 using a breach identification module. Related configuration items can be grouped 450 together using a processor and based on the topology to form a snapshot of a problem topology.

The method 400 can further include storing the snapshot in a snapshot database on the problem isolation server. The method can include transmitting the snapshot over a bus to a user display device to display the snapshot after a change in the topology. As described above, the step of forming a snapshot can exclude configuration items not related to the network device operation metrics breaching the baseline. The method can also include creating a graph representing the problem topology, wherein the graph shows a relationship between the configuration items.

With the problem isolation systems and methods described herein, events or monitored data can come into a single operations bridge. The events and data can be used to establish a problem topology snapshot which can be used to determine root events. The snapshot data can be used to determine actionable system conditions, and actions taken can be prioritized based on business impact. In some instances, a problem isolation system can be configured to identify or verify a root cause of a system problem based on the problem topology snapshot automatically, such as by using run-book automation. To aid a system administrator in identifying problems from the problem isolation snapshot, the snapshot can be enriched with extra state information and/or expert advice.

Some benefits of using the technology include: accurate problem topology modeling in a highly flexible environment, such as a virtualized data center; the ability to track the changes on that captured topology around the snapshot time frame; relatively small storage footprints: since the topology snapshots are taken only once a problem is detected and only a minimum set of CI's is captured, the technology uses only a small storage footprint. The combination of a strong, detailed database model with near-real-time problem detection capabilities creates a unique benefit for capturing snapshots from both an accuracy and a capacity perspective. Such a snapshot tool can provide enhanced and useful capabilities for a problem isolation or analysis system.

The methods and systems of certain examples may be implemented in hardware, software, firmware, or combinations thereof. In one example, the method can be executed by software or firmware that is stored in a memory and that is executed by a suitable instruction execution system. If implemented in hardware, as in an alternative example, the method can be implemented with any suitable technology that is well known in the art.

Also within the scope of an example is the implementation of a program or code that can be stored in a non-transitory machine-readable medium to permit a computer to perform any of the methods described above.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom VLSI (Very Large Scale Integration) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

The invention claimed is:

1. A non-transitory machine-readable medium with instructions stored therein for providing enhanced capabilities for problem isolation and analysis in a virtual environment, the instructions upon execution causing a system to:
   maintain a topology of network devices in the virtual environment;
   monitor the virtual environment for network device operation irregularities exceeding a threshold;
   identify a network device operation irregularity;
   identify a portion of the topology associated with the identified network device operation irregularity;
   group topology portions of the topology associated with the network device operation irregularities together to form a snapshot of a problem topology, wherein the grouping comprises grouping the topology portions associated with the network device operation irregularities together responsive to the network device operation irregularities occurring within a predetermined time interval from one another;
   display the snapshot of the problem topology; and
   perform problem management to remedy a problem represented by the problem topology using the snapshot of the problem topology.

2. The non-transitory machine-readable medium of claim 1, wherein the grouping of the topology portions comprises grouping the topology portions associated with the network device operation irregularities together further responsive to the network device operation irregularities being causally linked together.

3. The non-transitory machine-readable medium of claim 1, wherein the snapshot comprises a state of the problem topology existing at a time of the identified network device operation irregularity.

4. The non-transitory machine-readable medium of claim 1, wherein the instructions upon execution cause the system to store the snapshot in a snapshot database.

5. The non-transitory machine-readable medium of claim 1, wherein the network device operation irregularities exceeding the threshold are determined based on network device operation metrics collected during the monitoring being outside a baseline.

6. The non-transitory machine-readable medium of claim 1, wherein the network device operation irregularities exceeding the threshold are determined based on network device operation metrics collected during the monitoring being outside a specified range.

7. The non-transitory machine-readable medium of claim 1, wherein the grouped topology portions comprise the identified portion of the topology, and each respective topology portion of the grouped topology portions comprises plural configuration items associated with a respective network device operation irregularity of the network device operation irregularities.

8. The non-transitory machine-readable medium of claim 7, wherein the instructions upon execution cause the system to create a graph representing the snapshot, wherein the graph shows a relationship between the grouped topology portions.

9. The non-transitory machine-readable medium of claim 8, wherein the relationship comprises a causal relationship.

10. The non-transitory machine-readable medium of claim 8, wherein the relationship comprises a chronological relationship.

11. The non-transitory machine-readable medium of claim 7, wherein the snapshot excludes configuration items not related to the network device operation irregularities.

12. The non-transitory machine-readable medium of claim 7, wherein the plural configuration items comprise a configuration item selected from among a configuration item representing a hardware component, a configuration item representing a software component, or a configuration item representing a virtual machine.

13. A system comprising:
   a processor; and
   a non-transitory storage medium storing instructions for providing enhanced capabilities for problem isolation and analysis, the instructions executable on the processor to:
      maintain a topology of network devices in a virtual environment;
      monitor the virtual environment for network device operation irregularities associated with network device operation metrics that fall outside a baseline;
      identify partial topology portions of the topology associated with the network device operation irregularities, wherein each respective partial topology portion of the partial topology portions includes a respective set of plural configuration items;
      group the partial topology portions associated with the network device operation irregularities together to form a snapshot of a problem topology, wherein the grouping comprises grouping the partial topology portions associated with the network device operation irregularities together responsive to the network device operation irregularities occurring within a predetermined time interval from one another;
      display the snapshot of the problem topology; and
      perform problem management to remedy a problem represented by the problem topology using the snapshot of the problem topology.

14. The system of claim 13, further comprising a display device to graphically display the snapshot, including relationships of the grouped partial topology portions.

15. The system of claim 13, wherein the instructions are executable on the processor to track normal network device operation to establish the baseline.

16. The system of claim 13, wherein the instructions are executable on the processor to enrich the snapshot with state information or expert advice regarding a potential cause of the network device operation irregularities.

17. The system of claim 13, wherein the plural configuration items comprise a configuration item selected from among a configuration item representing a hardware component, a configuration item representing a software component, or a configuration item representing a virtual machine.

* * * * *